United States Patent
Priel et al.

(10) Patent No.: US 8,095,809 B2
(45) Date of Patent: Jan. 10, 2012

(54) SYSTEM AND METHOD FOR REDUCING POWER CONSUMPTION OF A TRANSISTOR-BASED CIRCUIT HAVING MULTIPLE OPERATIONAL MODES CHARACTERIZED BY DIFFERENT POWER CONSUMPTION LEVEL

(75) Inventors: Michael Priel, Hertzelia (IL); Dan Kuzmin, Givat Shmuel (IL); Anton Rozen, Gedera (IL)

(73) Assignee: Freescale Semiconductor, Inc., Austin, TX (US)

( * ) Notice: Subject to any disclaimer, the term of this patent is extended or adjusted under 35 U.S.C. 154(b) by 1063 days.

(21) Appl. No.: 11/910,069

(22) PCT Filed: Mar. 30, 2005

(86) PCT No.: PCT/IB2005/000830
§ 371 (c)(1),
(2), (4) Date: Sep. 28, 2007

(87) PCT Pub. No.: WO2006/103484
PCT Pub. Date: Oct. 5, 2006

(65) Prior Publication Data
US 2008/0195876 A1   Aug. 14, 2008

(51) Int. Cl.
G06F 1/32 (2006.01)
G06F 1/00 (2006.01)
(52) U.S. Cl. .................. 713/320; 713/323; 713/324
(58) Field of Classification Search .................. 713/320
See application file for complete search history.

(56) References Cited

U.S. PATENT DOCUMENTS

| | | | |
|---|---|---|---|
| 5,129,091 A * | 7/1992 | Yorimoto et al. | 713/323 |
| 5,475,321 A * | 12/1995 | Aoyama et al. | 326/46 |
| 5,535,398 A * | 7/1996 | Biggs et al. | 713/324 |
| 5,784,628 A * | 7/1998 | Reneris | 713/300 |
| 6,523,125 B1 * | 2/2003 | Kohno et al. | 713/320 |
| 6,792,551 B2 * | 9/2004 | Dai | 713/320 |
| 7,707,445 B2 * | 4/2010 | Gammel et al. | 713/324 |
| 2002/0162037 A1 | 10/2002 | Woods et al. | |
| 2004/0051574 A1 | 3/2004 | Ko et al. | |
| 2005/0289432 A1 * | 12/2005 | Saado et al. | 714/755 |
| 2006/0267654 A1 * | 11/2006 | Gururajarao et al. | 327/208 |
| 2008/0256551 A1 * | 10/2008 | Priel et al. | 718/108 |

FOREIGN PATENT DOCUMENTS

| | | |
|---|---|---|
| EP | 0580337 A2 | 1/1994 |
| WO | 9221081 A1 | 11/1992 |
| WO | 2004021351 A1 | 3/2004 |

* cited by examiner

Primary Examiner — Suresh Suryawanshi

(57) ABSTRACT

A method for reducing power consumption, and a system having power reduction capabilities, the method includes: storing, at a first circuit, data representative of a state of a second circuit, entering a low power mode, exiting low power mode, providing a default data value to the second circuit after exiting from the low power mode, and selectively providing data from the first circuit to the second circuit in response to the value of data and to a characteristic of a third circuit coupled to the first and second circuits.

25 Claims, 5 Drawing Sheets

SYSTEM AND METHOD FOR REDUCING POWER CONSUMPTION OF A TRANSISTOR-BASED CIRCUIT HAVING MULTIPLE OPERATIONAL MODES CHARACTERIZED BY DIFFERENT POWER CONSUMPTION LEVEL

FIELD OF THE INVENTION

The present invention relates to systems that have power reduction capabilities and to methods for reducing power consumption.

BACKGROUND OF THE INVENTION

Mobile devices or systems, such as but not limited to personal data appliances, cellular phones, radios, pagers, lap top computers, and the like are required to operate for relatively long periods before being recharged. These mobile devices usually include one or more processors as well as multiple memory modules and other peripheral systems.

The power consumption of a transistor-based system is highly influenced by leakage currents that flow through the transistor. The leakage current is responsive to various parameters including the threshold voltage (Vt) of the transistor, the temperature of the transistor, supply voltage and the like. Transistors that have higher Vt are relatively slower but have lower leakage currents while transistors that have lower Vt are relatively faster but have higher leakage current.

In order to reduce the power consumption of mobile systems various power consumption control techniques were suggested. A first technique includes reducing the clock frequency of the mobile system. A second technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption.

A third technique uses domino circuits that include both high threshold voltage transistors and low threshold voltage transistors. U.S. patent application number 2004/0008056 of Kursun et al., which is incorporated herein by reference, discloses a domino circuit that is configured such as to reduce power consumption, for example by limiting the energy consumed during power switching.

Yet another technique is based upon creating a stack effect that involves shutting down multiple transistors of the same type that are serially connected to each other. U.S. Pat. No. 6,169,419 of De et al., which is incorporated herein by reference, discloses a method and apparatus for reducing standby leakage current using a transistor stack effect. De describes a logic that has both a pull up path and a pull down path.

In some prior art systems data is stored in data retention circuits while other parts of the system are shut down. The following patents and patent applications, all being incorporated herein by reference, provide a brief overview of prior art retention circuits: U.S. patent application publication number 2004/0051574 of Ko et al; PCT patent application publication number WO 2004/021351A1 of Garg et al; U.S. Pat. No. 5,600,588 of Kawashima; U.S. patent application 2004/0227542 of Bhavnagarwala et al. and U.S. Pat. No. 6,755,180 of Biyani et al.

There is a growing need to find effective systems and methods for reducing power consumption of integrated circuits.

SUMMARY OF THE PRESENT INVENTION

A system and a method for reducing power consumption of a transistor-based circuit, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

It is noted that although the following example refers to NMOS and PMOS transistors this is not necessarily so as transistors that are manufactured by other processes can be represented by reference circuits.

The term "transistor-based circuit" refers to a circuit that include one or more transistors and can include various logic gates, memory circuits and the like.

The following examples refer to a low power mode as well as another high STANDBY of a transistor-based circuit. It is noted that the method can be applied, mutatis mutandis, to an integrated circuit in which there are multiple operational modes that are characterized by different power consumption level.

The invention also can be applied mutatis mutandis, to integrated circuit in which a control signal, such as but not limited to a STANDBY signal, is generated when entering a certain operational mode (or just before entering said mode) and where the control signal can affect the state of transistor-based circuits. It is further noted that different transistor-based circuits can receive different operational mode indication signals. The following figures illustrates a time difference between the assertion of the STANDBY signal and a RESET_signal, but this is not necessarily so.

Figure 1:
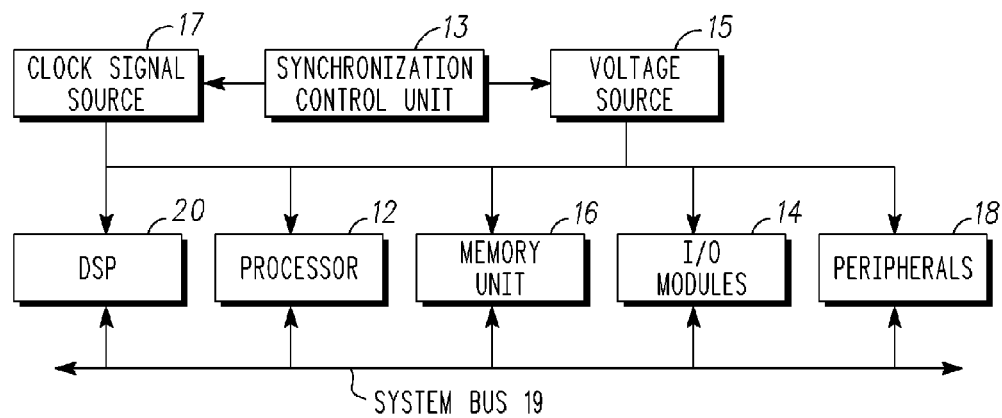
FIG. 1 illustrates a system, according to an embodiment of the invention.

FIG. 1 is a schematic illustration of a system, such as an integrated circuit, 10 that includes various devices. Each device may include a large number of power reduction circuitries, according to an embodiment of the invention.

System 10 includes various devices such as but not limited to general purpose processor 12, I/O module 14, memory unit 16, peripheral 18, and digital signal processor (DSP) 20. These devices are linked to each other by various lines and buses and receive clock signals and power supply from one or more sources, such as clock signal source 17 and voltage source 15. It is noted that system 10 can include other devices, that some of these device are optional and that system 10 can include multiple devices of the same kind.

Optionally, the clock signal source 17 and the voltage source 15 are also connected to a synchronization control unit 13 that matches between the clock frequency and supplied voltages, such as to prevent a case in which the voltage supplied to and devices is too low to support the clock frequency of the clock signal. This matching is useful when altering the operational mode of the integrated circuit and applying DVFS techniques. It is noted that this configuration is optional and that system 10 does not necessarily apply DVFS techniques.

Typically, system 10 includes multiple busses and lines and the various devices of system 10 can be connected to the same bus, but this is not necessarily so. For convenience of explanation FIG. 1 illustrates a system bus that is shared by devices 12, 14, 16, 18 and 20.

It is noted that system 10 can have various configurations and that the devices illustrated in FIG. 1 represent only a single exemplary configuration of a system that applies the power reduction technique. Typically, system 10 is included within a mobile device such as a cellular phone.

Modern integrated devices such as processor 12 and DSP 20 can include millions of transistors. System 10, or at least some of its devices (such as but not limited to processor 12 and DSP 20) can operate in various operational modes, including low power modes such as but not limited to an idle mode or standby mode. During a standby mode it is desired to reduce the power consumption of a device, especially in view of the low computational load imposed on said device during said mode.

Typically, once system 10, or one of its devices (it is assumed for convenience of explanation that processor 12 makes this decision) decides to enter a standby mode it issues a STANDBY signal indicating that it is entering (or is about to enter) such a low power mode. It is noted that devices can issue local STANDBY signal as well as global STANDBY signals, and can issue ACTIVE signals instead of STANDBY signals, or a combination of both. For simplicity of explanation it is assumed that a device asserts a STANDBY signal once it enters a low power mode (or just before entering such a mode) and that it negates said signal once it exits the low power mode.

It is also assumed that in some cases (for example, when the low power mode is a standby mode) the device asserts a RESET_signal when it exits the low power mode. As mentioned above the signal can be a global signal, a local signal and the like. Typically, the RESET_signal is asserted once the device is turned on.

System 10 can selectively shut down many circuits during various modes, especially during low power modes such as but not limited to idle mode or standby mode. This selective shut down is also referred to as power gating. The shut down circuits can be memory circuits, logic gates and the like, thus reducing the power consumed during standby mode. In some case substantially the whole memory circuit is shut down but in other cases only a portion of the memory circuit is shut down.

Typically, the state of many transistors or transistor-based circuits is affected by a RESET_signal. Typically such transistor-based circuits receive a RESET_signal or a derivative of said signal, or are connected to circuitry such as but not limited to pull up circuitry or pull down circuitry that affect and even determine their state.

Figure 2:
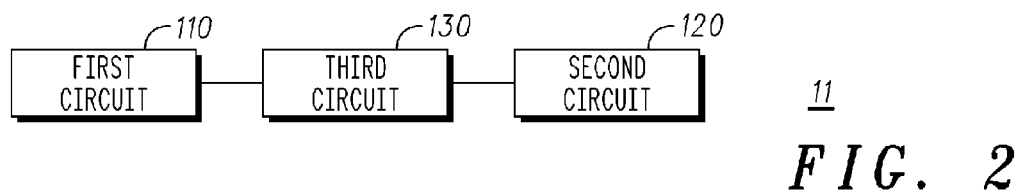
FIG. 2 illustrates a portion of a system, according to an embodiment of the invention.

FIG. 2 illustrates a portion 11 of system 10, according to an embodiment of the invention.

The portion 11 includes a third circuit 130 that is connected between a first circuit 110 and a second circuit 120. The first circuit 110 stores data that is representative of a state of the second circuit 120. The first circuit 110 is activated during a low power mode while the second circuit 120 is deactivated during the low power mode. The activation can be implemented by providing a supply voltage to the first circuit 110 during the low power mode. During a low power mode the second circuit 120 does not receive that supply voltage. The second circuit 120 is adapted to enter a default state after it exits the low power mode. The default state is characterized by outputting a default value by the third circuit 130.

Portion 11 also includes a third circuit 130 that selectively provides the stored data from the first circuit 110 to the second circuit 120. Said selective provision is response to the value of the stored data and to a characteristic of a third circuit 130.

Figure 3:
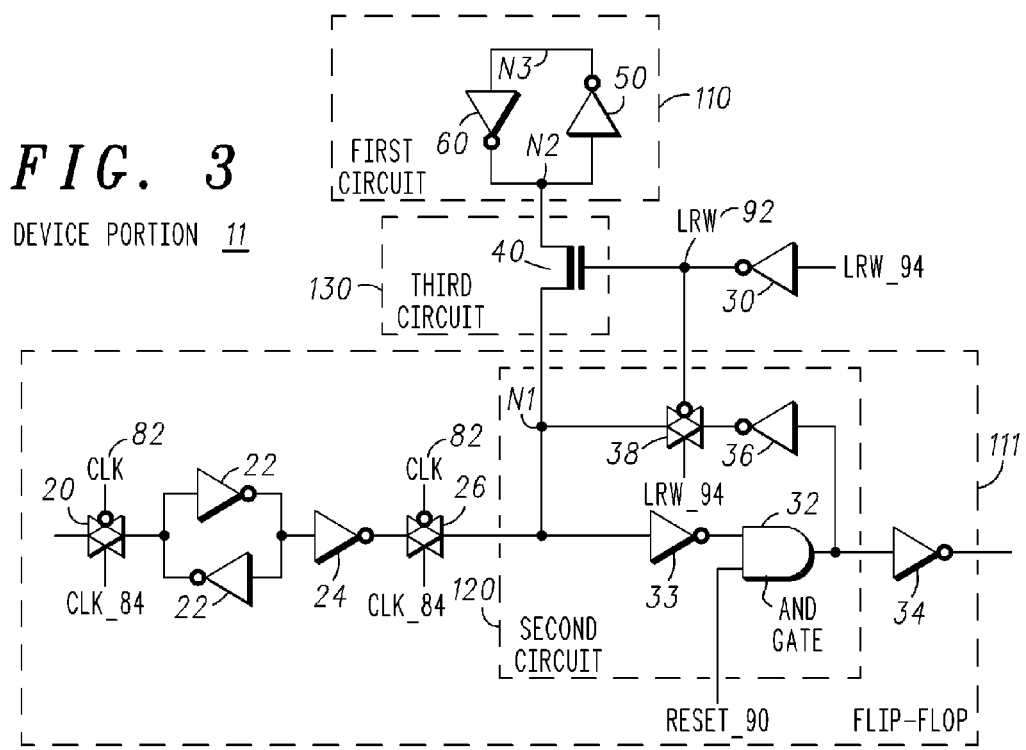
FIG. 3 illustrates a transistor-based logic such as a flip-flop and a power reduction circuitry, according to an embodiment of the invention.

FIG. 3 illustrates a transistor-based logic such as flip-flop 111 and a power reduction circuitry such as 110 and 130, according to an embodiment of the invention. The first circuit 110 includes a fifth and sixth inverters 50 and 60 that form a latch. The second circuit 120 includes an AND gate 32, a fifth inverter 36, a ninth inverter 33 and a third transfer gate 38. The third circuit includes an NMOS transistor 40.

An input node of first transfer gate 20 forms the input node of flip-flop 111. The output of the first transfer gate 20 is connected to first and a second invertors 22 that are connected in parallel to each other such that the input of one inventor is connected to an output of the second inverter. These two inverters 22 are connected to a third inverter 24 that in turn is connected to a second transfer gate 26.

The output of the second transfer gate 26 is connected to an input of ninth inverter 33 at a first node denoted N1. The output of the ninth inverter 33 is connected to a first input of an AND gate 32. The output of the AND gate 32 is connected to a forth inverter 34 and to a fifth inverter 36. The output of the fifth inverter 36 is connected to a third transfer gate 38.

The output of the third transfer gate 38 is connected to the first node N1 and to a drain of transistor 40. The source of transistor 40 is connected to a second node N2. The second node N2 is also connected to an input of seventh inverter 50 and to an output of a eighth inverter 60. The output of the seventh inverter 50 is connected to the input of the eighth inverter 60 at a third node N3. The eighth and ninth inverters 50 and 60 form a retention latch.

The gate of transistor 40 is connected to an output of a sixth inverter 30. The input of this sixth inverter 30 receives an inverted latch read/write signal LRW_94. The sixth inverter 30 inverts the inverted LRW_94 to provide a latch read/write signal LRW 92 to the gate of transistor 40. This signal activated the transistor during the retention latch read and write periods.

LRW 92 is asserted before entering a low power mode, to enable the writing of the data to the first circuit 110. LRW 92 is also asserted when there is a need to read said stored data from the retention latch.

First and second transfer gates 20 and 26 receive a CLK signal 86 and an inverted CLK signal (CLK_) 84. Third transfer gate 38 is triggered by LRW 92 and by LRW_94.

Once system 10, or at least portion 11, enters a low power mode the second and third circuits 120 and 130 are shut down, thus reducing the power consumption during the low power mode. This can be achieved by not supplying these circuits with any voltage or reducing the level of the supply voltage beneath a predefined non-operable threshold.

Transistor 40 is placed between the first and second circuits 110 and 120 for isolating these circuits from each other during the low power mode.

An NMOS transistor can be shut down by disconnecting it from a supply source, or by providing a low supply voltage to its gate. On the other hand an efficient shut down of a PMOS transistor may require to connect the gate of the PMOS transistor to a high level signal.

Accordingly, using NMOS transistors can be more power efficient than using PMOS transistors.

According to an aspect of the invention only few transistors receive a supply voltage during the low power mode. Referring to the example set forth in FIG. 2, only the seventh and eighth inverters 50 and 60 receive a supply voltage (V_retention) during the low power mode.

NMOS transistors are frequently used as switches or as conveying (transferring) components. Typically, data is selectively passed between an NMOS transistor source to its drain (or vise verse). NMOS transistors pass low level signals ("0") without affecting them, but have a negative affect on high level signals ("1").

When an NMOS transistor receives a high level signal it provides a reduced output signal. The reduction is substantially equal to the threshold voltage $V_t$ of the transistor. PMOS transistors pass high level signals without affecting them but increase the level of low level signals. Accordingly, NMOS transistors are placed in pull down circuit, while PMOS transistors are placed in pull up circuits.

According to an embodiment of the invention the NMOS transistor 40 will write to first node N1 only if the first circuit 110 stores a low level data. If the stored data is a high level data then the second circuit 120, and not transistor 40, will provide a high level signal to first node N1.

Figure 4:
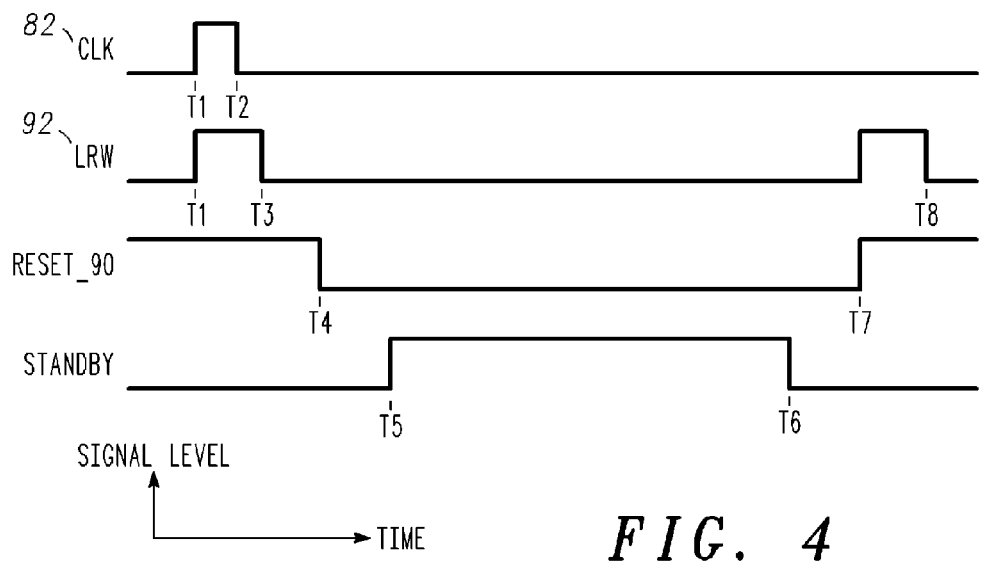
FIG. 4 is a timing diagram illustrating the operation of the first till third circuits, according an embodiment of the invention.

FIG. 4 is a timing diagram illustrating the operation of the first till third circuits 110-130, according to an embodiment of the invention.

Figure 6:
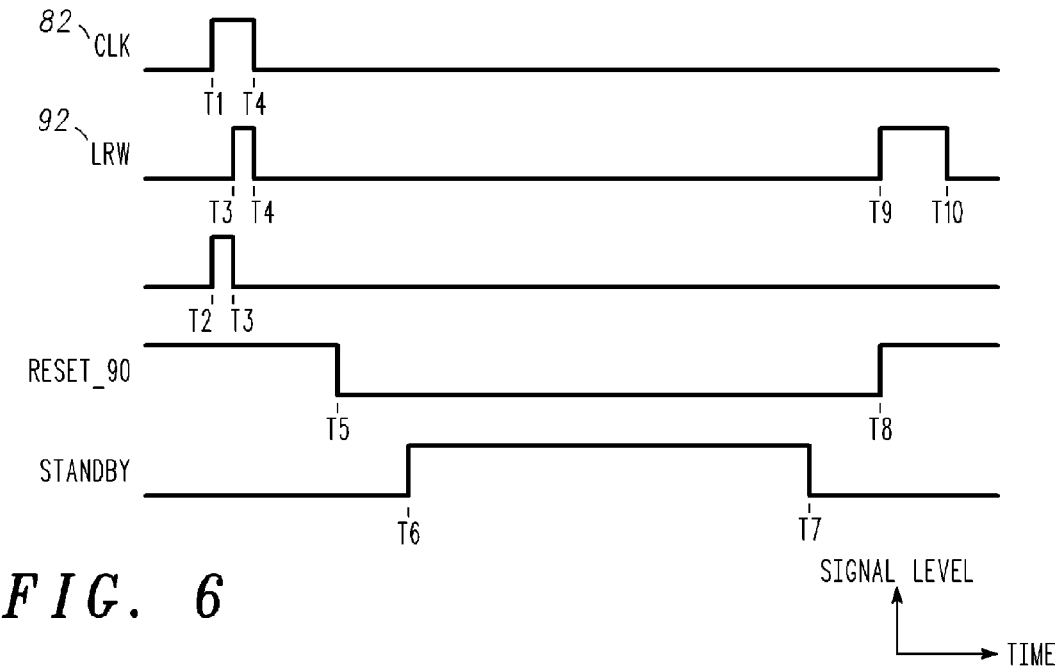
FIG. 6 is a timing diagram illustrating the operation of the first till third circuits, according to an embodiment of the invention.

FIG. 4 as well as FIG. 6 provide only one possible relationships between various signals. It is noted that other signals can be used for implementing the invention and that the timing relationships between the signals can be changed without exceeding the scope of the invention. For example some of the signals that were negated (or asserted)_simultaneously can be negated (or asserted) in a sequential manner, and vise verse.

At time T1 the CLK 82 signal is asserted in order to allow data to pass through the first and second transfer gates 20 and 26. This will cause the data that is inputted to flip-flop 111 to be written to first node N1. CLK 82 is negated at T2.

At T1 LRW 92 is asserted and LRW_94 (not illustrated in FIG. 4) is negated. The provision of high level LRW 92 to the gate of transistor 40 as well as to the third transfer gate 38 writes the data at node N1 to the first circuit 110. LRW 92 is negated at T3.

At T4, after both CLK 82 and LRW 92 are negated, RESET_90 is negated At T5 flip-flop 111, second and third circuits 120 and 130 enter a low power mode. During this mode only the first circuit 110 receives a supply voltage that allows it to store the received data during the low power mode. The entrance to the low power mode can be indicated by an assertion of a STANDBY signal.

These circuits exit the low power mode at T6. After T6 all circuits receive a supply voltage. The exit from the low power mode can be indicated by a negation of a STANDBY signal.

Between T6 and T7 RESET_90 and LRW 92 are still low. The low level RESET_90 signal forces AND gate 32 to output a low level signal at its output. This signal is inverted by fifth inverter 36. The fifth inverter 36 provides a high level signal, via third transfer gate 38, to the first node N1. In other words, the first node N1 is set to a default value (high).

The high level signal of N1 is inverted by the ninth inverter 33 and provided to the first input of AND gate 32. AND gate 32 receives two low level signals at its inputs and output a high level signal.

At T7 RESET_90 and LRW 92 are asserted. This wakes up transistor 40. If the data that is stored at the first circuit 110 is "1" (high value then transistor 40 receives a high level signal at his source and at drain and does not write the high level signal into the first node N1. Thus, the second circuit 120 remains in a default state.

If the data that is stored at first circuit 110 is low then transistor 40 acts as a pull down circuit and ground the first node N1. The AND gate 32 receives a high level signal at both its inputs and outputs a high level signal.

After a while (at T8) LRW 92 is negated and the transistor 40 is shut down. Thus, the first circuit 110 is disconnected from flip flop 111. RESET_90 is high, thus the AND gate 32 acts as a transfer gate and outputs the signal that is provided to its first input.

Figure 5:
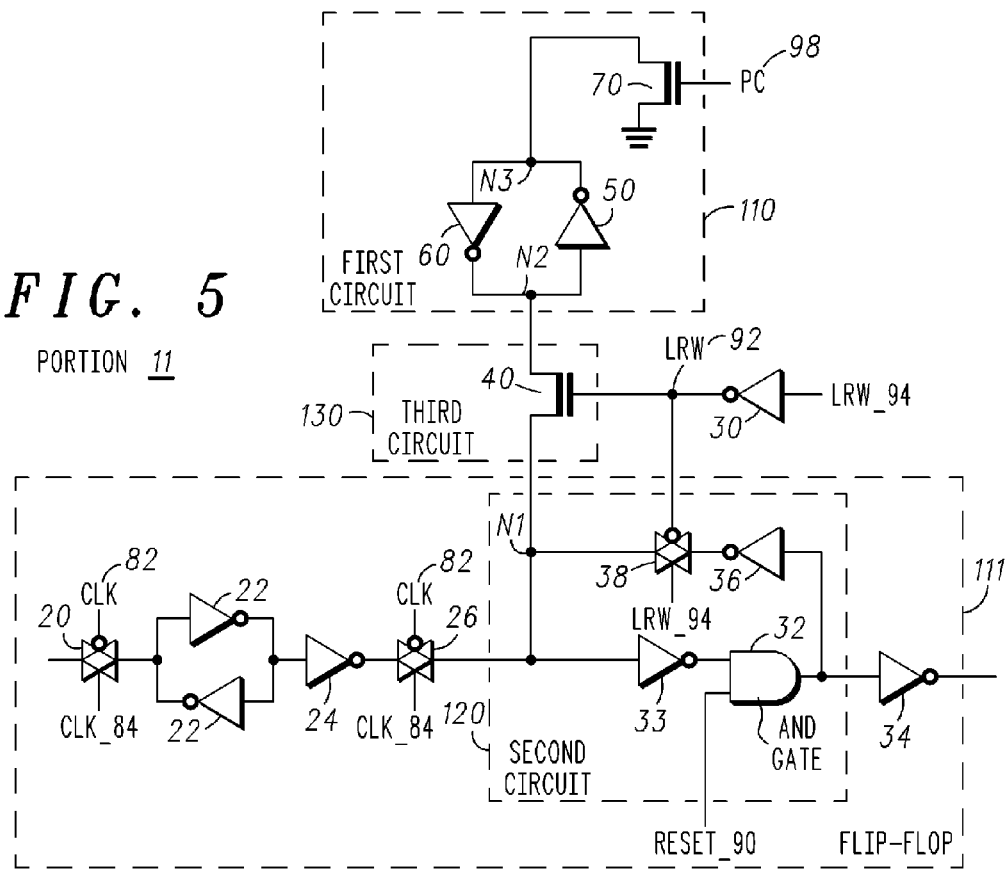
FIG. 5 illustrates a transistor-based logic such as a flip-flop and a power reduction circuitry, according to another embodiment of the invention.

FIG. 5 illustrates a transistor-based logic such as flip-flop 111 and a power reduction circuitry such as 110' and 130, according to another embodiment of the invention.

The first circuit 110' of FIG. 5 differs from the first circuit 110 of FIG. 3 by having a pre-charge transistor 70 that pre-charges the first circuit 110'. Accordingly, the first circuit 110' is pre-charged with a certain pre-charge default value and if the data to be written to the first circuit 110' by transistor 40 is the same (As the pre-charge default value) no writing activity takes place. During a pre-charge period the pre-charge transistor 70 pulls down the voltage of third node N3, thus writing "1" at second node N2. If the data at node N1 before entering low power mode is "1" then transistor 40 does not write this value to the first circuit 110'. If the data at node N1 is low transistor 40 pulls down the voltage of second node N2.

FIG. 6 is a timing diagram illustrating the operation of the first till third circuits 110'-130, according to an embodiment of the invention.

At time T1 the CLK 82 signal is asserted in order to allow data to pass through the first and second transfer gates 20 and 26. This will cause the data that is inputted to flip-flop 111 to be written to first node N1. CLK 82 is negated at T4.

At T2 a pre-charge signal (PC) 98 is asserted. The pre-charge transistor 70 receives PC 98 at its gate and pulls down the voltage of third node N3. Thus, forcing node N2 to store a high level signal.

At T3 PC 98 is negated (thus shutting down pre-charge transistor 70) and LRW 92 is asserted. Accordingly LRW_94 is negated.

The provision of high level LRW 92 to the gate of transistor 40 as well as to the third transfer gate 38 writes the data at node N1 to the first circuit 110 only if the data is "0". If the data is "1" then the second node N2 already stores "1" and the transistor 40 does not perform any writing activity. LRW 92 is negated at T4.

At T5, after both CLK 82 and LRW 92 are negated, RESET_90 is negated.

At T6 flip-flop 111, second and third circuits 120 and 130 enter a low power mode. During this mode only the first circuit 110 receives a supply voltage that allows it to store the received data during the low power mode.

These circuits exit the low power mode at T7. After T7 all circuits receive a supply voltage.

Between T7 and T8 RESET_90 and LRW 92 are still low. The low level RESET_90 signal forces AND gate 32 to output a low level signal at its output. This signal is inverted by fifth inverter 36 that provided a high level signal, via third transfer gate 38 to the first node N1. The high level signal is inverted by the ninth inverter 33 thus AND gate 32 receives two low level signals at its inputs and output a low level signal.

At T8 RESET_90 is asserted. At T9 LRW 92 is asserted. This wakes up transistor 40. If the data that is stored at the first circuit 110 is "1" then transistor 40 receives a high level signal at his source and at drain and does not write the high level signal into the first node N1. Thus, the second circuit 120 remains in a default state.

If the data that is stored at first circuit 110 is low then transistor 40 acts as a pull down circuit and ground the first node N1. The AND gate 32 receives a high level signal at both its inputs and outputs a high level signal.

After a while (at T10) LRW 92 is negated and the transistor 40 is shut down. Thus, the first circuit is disconnected from flip flop 111. RESET_90 is high, thus the AND gate 32 acts as a transfer gate and outputs the signal that is provided to its first input.

According to an embodiment of the invention the eighth inverter 50 includes a weak NMOS transistor and a weak PMOS transistor. The ninth inverter 60 includes a strong NMOS transistor and a weak PMOS transistor.

According to another embodiment of the invention the first circuit 110 does not need to write "1" over NMOS transistor 40, thus it does not need to consume a relatively large amount of current and can be optimized for low leakage.

The first circuit 110 (or 110') does not write "1" to the second circuit 120. It is only required to discharge first node N1 relatively quickly, in order not to slow flip-flop 111. Accordingly, the ground grid that is connected to the first circuit 110' has to be relatively conductive. On the other hand, the first circuit 110 can receive its supply voltage via a relatively high impedance power grid, thus simplifying the power grid as well as reducing the width of the power grid. This eases the power grid demands and simplifies the design of such a circuit.

Figure 7:
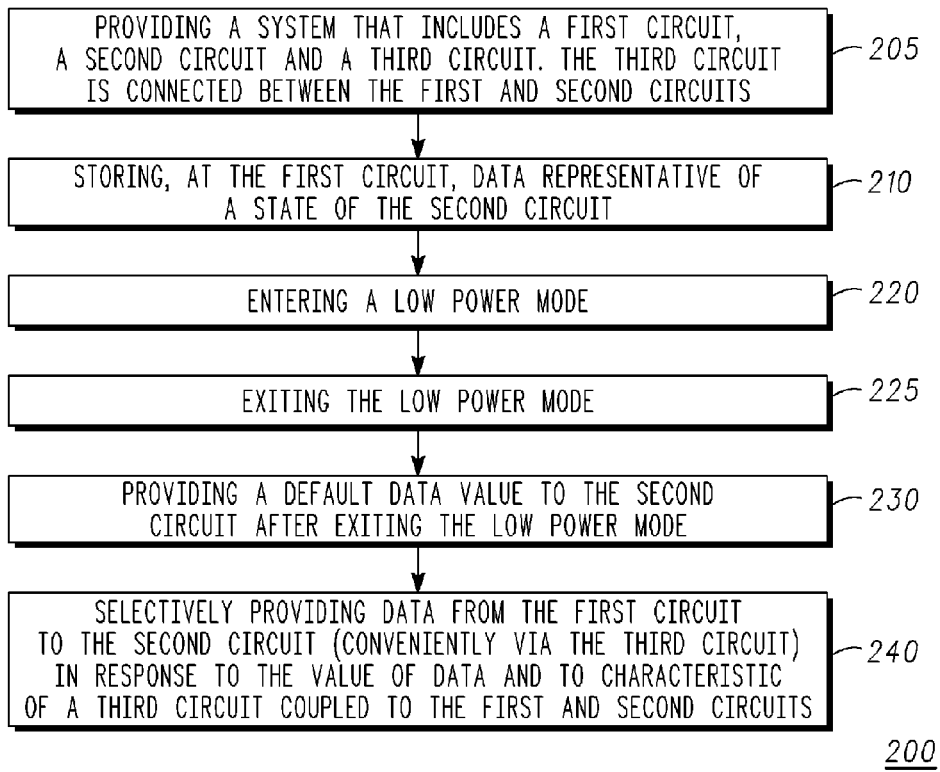
FIG. 7-FIG. 10 are flow charts of methods for reducing power consumption of one or more transistor-based circuits, according to various embodiments of the invention.

FIG. 7 is a flow chart of method 200 for reducing power consumption of one or more transistor-based circuits, according to an embodiment of the invention. Conveniently, a transistor-based circuit is a memory circuit that includes one or more register cells. It is noted that method 200 is usually applied in an environment that includes many transistor-based circuits, but it can also be applied to reduce the power consumption of a single transistor-based circuit.

Method 200 starts by stage 205 of providing a system that includes a first circuit, a second circuit and a third circuit. The third circuit is connected between the first and second circuits. Referring to the examples set forth in FIG. 2 and FIG. 3 a system 10 that include a first circuit 110, a second circuit 120 and a third circuit 130 is provided.

Conveniently, the system, and especially the second circuit, is designed such as to provide a default value after (or while) the system exits a low power mode. Conveniently, the default value is selected in response to the characteristic of the third circuit. According to an embodiment of the invention the default value is selected in response to transferring (or writing) characteristics of the third circuit. If the third circuit can better write (for example, with lower distortions or with lower degradations) a low level value than the default value is conveniently a high level signal. It is noted that this characteristic can also relate to timing issues—which value can be written in a shorter period by the third circuit.

Conveniently, the characteristic reflects a capability of the third circuit to provide the data to the first circuit. Conveniently, the third circuit includes an NMOS transistor and the default value is "1". Conveniently, the third circuit includes PMOS transistor and the default value is "0".

Stage 205 is followed by stage 210 of storing, at the first circuit, data representative of a state of the second circuit. Referring to the example set forth in FIG. 3 and FIG. 4, transistor 40 writes the data stored at first node N1 to first circuit 110 or 110' during time period T1 to T3.

Stage 210 is followed by stage 220 of entering a low power mode. Referring to the example set forth in FIG. 3 and in FIG. 4, the third and second circuits 120 and 130 do not receive a supply voltage between T5 and T6. This is represented by the assertion of a STANDBY signal between T5 and T6.

Stage 220 is followed by stage 225 of exiting the low power mode. It is noted that stage 230 can be regarded as a part of said exit but this is not necessarily so. Stage 225 is followed by stage 230 of providing a default data value to the second circuit after exiting the low power mode. Referring to the example set forth in FIG. 3 and in FIG. 4, RESET_90 is low between T6 and T7, thus writing "1" to first node N1.

Stage 230 is followed by stage 240 of selectively providing data from the first circuit to the second circuit (conveniently via the third circuit) in response to the value of data and to a characteristic of a third circuit coupled to the first and second circuits.

Referring to the example set forth in FIG. 3 and in FIG. 4, LRW 92 is asserted between T7 and T8. During this period if the data stored at first circuit 110 is "1" then the first node N1 remains at its default value of "1". Thus, transistor 40, that is more adapted to write "0" than "1", is not required to write "1".

If the data stored at the first circuit 110 (especially at second node N2) is "0" then transistor 40 writes this value to first node N1 by pulling node N1 down.

According to another embodiment of the invention the third circuit 130 can include a PMOS transistor instead of the NMOS transistor 40. In such a case the second circuit and the pre-charge circuits should be designed such as to allow the third circuit to write "1" while providing "0" as a default value.

The power reduction conveniently includes shutting down at least a portion of the transistor-based circuits during the low power more. For example, a first register cell of a flip-flip can be shut down during the low power mode while a second register cell is selectively shut down, depending upon its reset value and its actual state before entering a low power mode.

Figure 8:
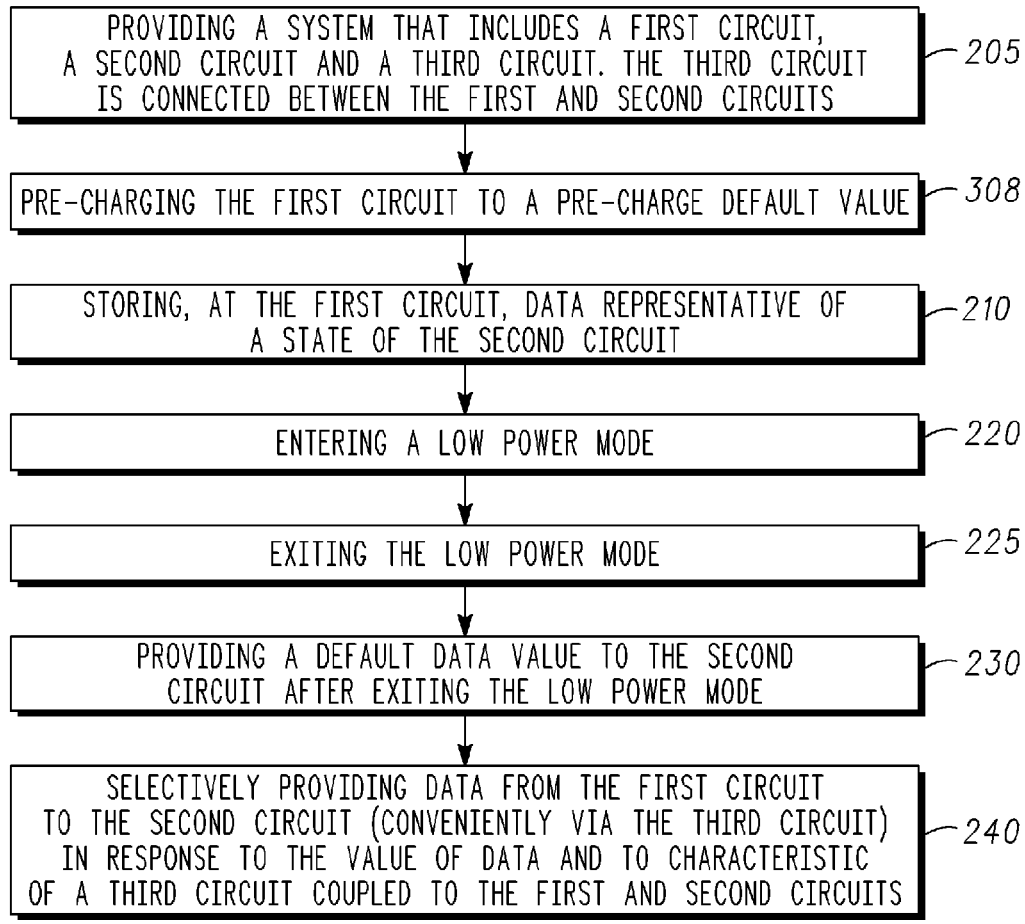

FIG. 8 is a flow chart of method 300 for reducing power consumption of one or more transistor-based circuits, according to an embodiment of the invention.

Method 300 differs from method 200 by including stage 308 of pre-charging the first circuit to a pre-charge default value. Conveniently, the pre-charge default value is responsive to a characteristic of the third circuit. The characteristic can reflect a distortion introduced by the third circuit. Referring to the example set forth in FIG. 5 and FIG. 6, during T2 till T3 the pre-charge transistor 70 pulls down third node N3, thus writing "1" to the second node N2.

Stage 308 is followed by stage 210 of storing, at the first circuit, data representative of a state of the second circuit. It is noted that if the pre-charge default value equals the data then there is no writing process during stage 210. Referring to the example set forth in FIG. 5 and FIG. 6, between T3 and T4 LRW 92 is asserted. If the data at first node N1 equals "0" transistor 40 pulls down second node N2 to zero. If the data equals "1" the transistor 40 receives "1" at his source and its drain and does not write into second node N2.

Figure 9:
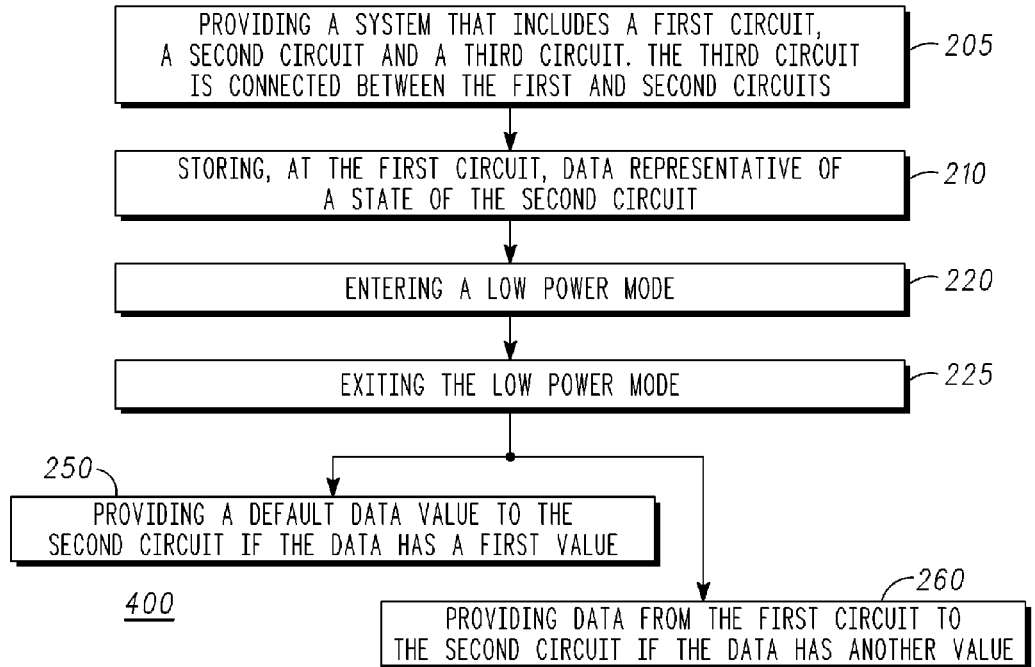

FIG. 9 is a flow chart of method 400 for reducing power consumption of one or more transistor-based circuits, according to an embodiment of the invention.

Method 400 differs from method 200 By having stages 250 and 260 instead of a sequence of stages 230 and 240.

Thus, after the system 10 or a relevant portion such as portion 11 exits the low power mode the method continues to stages 250 and 260. Stage 250 includes providing a default data value to the second circuit if the data has a first value. Stage 260 includes providing data from the first circuit 110 to the second circuit 120 if the data has another value. Thus, instead of first providing a default value and then selectively writing data from the first circuit, in method 400 stages 250 and 260 provide one value.

Figure 10:
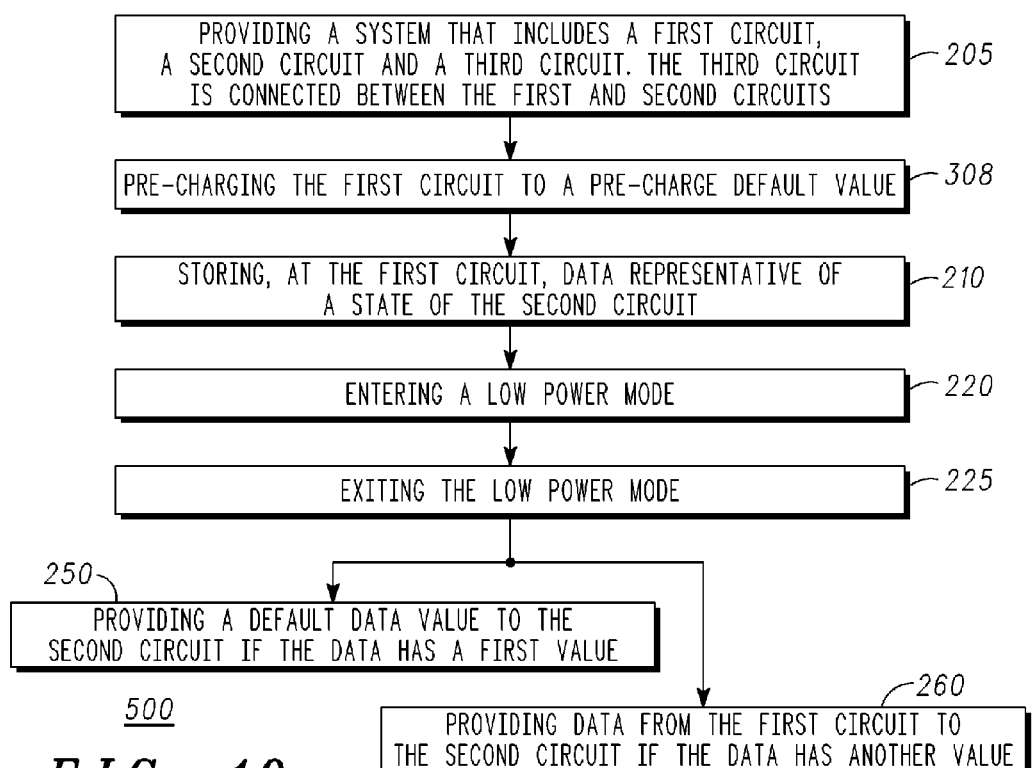

FIG. 10 is a flow chart of method 500 for reducing power consumption of one or more transistor-based circuits, according to an embodiment of the invention.

Method 500 differs from method 300 By having stages 250 and 260 instead of a sequence of stages 230 and 240.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for reducing power consumption, the method comprises:
   storing, at a first circuit, data representative of a state of a second circuit, and entering a low power mode of the first circuit and the second circuit;
   providing a default data value to the second circuit after exiting the first and the second circuit from the low power mode, and selectively providing data from the first circuit to the second circuit in response to a value of the data representative of the state of the second circuit and to a characteristic of a third circuit coupled to the first and second circuits.

2. The method according to claim 1 wherein the characteristic reflects a capability of the third circuit to provide the data to the first circuit.

3. The method according to claim 1 wherein the characteristic reflects a distortion introduced by the third circuit.

4. The method according to claim 1 wherein the default data value is in response to the characteristic of the third circuit.

5. The method according to claim 4 wherein the default data value is in responsive to a data value that can be better provided by the third circuit.

6. The method according to claim 4 wherein the default data value differs from the value of the data from the first circuit that can be better written by the third circuit.

7. The method according to claim 1 wherein the third circuit comprises an NMOS transistor and whereas the default value is "1".

8. The method according to claim 1 wherein entering the low power mode comprises shutting down the third circuit.

9. The method of claim 1 wherein the providing comprises providing the data from the first circuit via the third circuit to the second circuit.

10. The method according to claim 1 further comprising pre-charging the first circuit to a pre-charge default value.

11. The method according to claim 10 wherein the pre-charge default value is responsive to the characteristic of the third circuit.

12. The method according to claim 10 wherein the characteristic of the third circuit reflects a distortion introduced by the third circuit.

13. A method for reducing power consumption, the method comprises:
   storing at a first circuit data representative of a state of a second circuit;
   entering a low power mode of the first circuit and the second circuit;
   exiting a low power mode of the first circuit and the second circuit, characterized by providing a default data value to the second circuit if the data representative of the state of the second circuit has a first value; and
   providing data from the first circuit to the second circuit if the data representative of the state of the second circuit has another value;
   wherein the first circuit comprises a latch that is powered when the first circuit is in the low power mode; wherein the second circuit comprises a transfer gate, an AND gate and a pair of inverters that are coupled to the AND gate; wherein a third circuit comprises a transistor that is coupled between the latch and between a first node; and wherein the first node is coupled to the transfer gate to an inverter of the pair of inverters.

14. A system having power reduction capabilities, the system comprises:
   a third circuit coupled between a first circuit and a second circuit; wherein the first circuit is adapted to store data representative of a state of the second circuit, wherein the first circuit is activated during a low power mode while the second circuit is deactivated during the low power mode;
   the second circuit that is adapted to enter a default state after exiting the low power mode; and
   wherein the third circuit selectively provides data from the first circuit to the second circuit in response to a value of the data and to a characteristic of the third circuit.

15. The system of claim 14 wherein the second circuit enters the default state in response to a signal indicating an end of the low power mode.

16. The system according to claim 14 wherein the characteristic of the third circuit reflects a capability of the third circuit to provide the data to the first circuit.

17. The system according to claim 14 wherein the characteristic of the third circuit reflects a distortion introduced by the third circuit.

18. The system according to claim 14 wherein the default state is responsive to the characteristic of the third circuit.

19. The system according to claim 14 wherein the default state is determined in response to a data value that can be better provided by the third circuit.

20. The system according to claim 14 wherein the third circuit is shut down during a low power mode.

21. The system according to claim 14 wherein the first circuit comprises a pre-charge circuit for pre-charging the first circuit to a pre-charge default value.

22. The system according to claim 21 wherein the pre-charge default value is responsive to a characteristic of the third circuit.

23. The system according to claim 21 wherein the characteristic of the third circuit reflects a distortion introduced by the third circuit.

24. The system according to claim 14 wherein the first circuit comprises a latch that is powered when in the low power mode; wherein the second circuit comprises a transfer gate an AND gate and a pair of inverters that are coupled to the AND gate; wherein the third circuit comprises a transistor that is coupled between the latch and between a first node; and wherein the first node is coupled to the transfer gate and to an inverter out of the pair of inverters.

25. The method according to claim 1 wherein the first circuit comprises a latch that is powered when in the low power mode; wherein the second circuit comprises a transfer gate, an AND gate and a pair of inverters that are coupled to the AND gate; wherein the third circuit comprises a transistor that is coupled between the latch and between a first node; and wherein the first node is coupled to the transfer gate and to an inverter out of the pair of inverters.

\* \* \* \* \*

UNITED STATES PATENT AND TRADEMARK OFFICE
CERTIFICATE OF CORRECTION

PATENT NO. : 8,095,809 B2
APPLICATION NO. : 11/910069
DATED : January 10, 2012
INVENTOR(S) : Michael Priel et al.

It is certified that error appears in the above-identified patent and that said Letters Patent is hereby corrected as shown below:

Column 10, Line 13, please change "exiting a low" to --exiting the low--

Column 10, Line 61, please change "responsive to a characteristic" to --responsive to the characteristic--

Signed and Sealed this
Twenty-eighth Day of February, 2012

David J. Kappos
*Director of the United States Patent and Trademark Office*